_United States Patent_ [19]

Sugar

[11] 4,148,446
[45] Apr. 10, 1979

[54] DUAL SENSITIVE RETRACTOR

[75] Inventor: Joseph Sugar, Los Angeles, Calif.

[73] Assignee: American Safety Equipment Corporation, Encino, Calif.

[21] Appl. No.: 748,655

[22] Filed: Dec. 8, 1976

Related U.S. Application Data

[63] Continuation-in-part of Ser. No. 576,308, May 12, 1976, abandoned.

[51] Int. Cl.² .................. A60B 35/02; B65H 75/48
[52] U.S. Cl. .................. 242/107.4 A; 242/107.4 B; 403/359; 403/368
[58] Field of Search .................. 242/107.4 R–107.4 E, 242/118.61; 297/388; 280/744–747; 403/359, 368, 370, 372

[56] References Cited

U.S. PATENT DOCUMENTS

| | | | |
|---|---|---|---|
| 700,763 | 5/1902 | Ham | 191/95 |
| 888,418 | 5/1908 | Burdon | 191/95 |
| 1,393,570 | 10/1921 | Ricketts | 191/95 |
| 1,987,991 | 1/1935 | Clinton | 242/118.61 |
| 2,845,233 | 7/1958 | Pfankuch | 242/107.4 R |
| 2,845,234 | 7/1958 | Cushman | 242/107.4 R |
| 3,081,960 | 3/1963 | Howe | 242/118.61 X |
| 3,122,338 | 2/1964 | Whittingham | 242/107.4 R |
| 3,203,641 | 8/1965 | McFarlane | 242/107.4 R |
| 3,292,744 | 12/1966 | Replogle | 188/135 |
| 3,323,749 | 6/1967 | Karlsson | 242/107.4 R |
| 3,343,763 | 9/1967 | Spouge | 242/107.4 R |
| 3,430,891 | 3/1969 | Burleigh | 242/107.4 R |
| 3,446,454 | 5/1969 | Kovacs | 242/107.4 R |
| 3,450,368 | 6/1969 | Glauser et al. | 242/107.4 B |
| 3,476,333 | 11/1969 | Weman | 242/107.4 R |
| 3,482,799 | 12/1969 | Wrighton et al. | 242/107.4 B |
| 3,552,676 | 1/1971 | Weber | 242/107.4 R |
| 3,568,948 | 3/1971 | Burns | 242/107.4 B |
| 3,664,600 | 5/1972 | Sargeant | 242/107.4 R |
| 3,666,198 | 5/1972 | Neumann | 242/107.4 R |
| 3,695,545 | 10/1972 | Peters | 242/107.4 R |
| 3,700,183 | 10/1972 | Rex | 242/107.4 R |
| 3,779,479 | 12/1973 | Lindblad | 242/107.4 R |
| 3,802,642 | 4/1974 | Klink | 242/107.4 R |
| 3,819,126 | 6/1974 | Stoffel | 242/107.4 R |
| 3,883,089 | 5/1975 | Close | 242/107.4 B |
| 3,897,024 | 7/1975 | Takada | 242/107.4 B |
| 3,907,227 | 9/1975 | Takada | 242/107.4 B |
| 3,917,189 | 11/1975 | Bryll | 242/107.4 B |
| 3,991,953 | 11/1976 | Takada | 242/107.4 B X |

FOREIGN PATENT DOCUMENTS 151483  5/1951  Australia .................. 403/368

*Primary Examiner*—Harvey C. Hornsby
*Assistant Examiner*—John M. Jillions
*Attorney, Agent, or Firm*—Poms, Smith, Lande, Glenny & Rose

[57] ABSTRACT

A dual sensitive retractor prevents protraction of webbing when either a predetermined vehicle acceleration or webbing acceleration occurs. The reel includes a shaft which is rotatably mounted on a frame. Locking means, in the form of a lock cup, on the frame moves locking pawls into and out of the path of ratchet teeth on the reel. An inertia mass is mounted on the shaft for rotation with respect to the shaft, and an inertia weight is provided which is responsive to changes in the inertia of the vehicle. The invention includes the improvement of providing a latch and means for mounting the latch for engaging the locking means to prevent webbing protraction. Drive means, which in one embodiment is a cam fixed to the shaft contacting the latch generally is driven by the shaft and is connected to the latch to impart rotation from the shaft to the inertia mass and to move the latch into engagement with the locking means when the webbing acceleration rotates the shaft faster than the inertia mass. A gear and means mounting the gear on the shaft for rotation with respect to the shaft are provided. The gear is engageable by the inertia weight to prevent its rotation with the shaft. A gear connecting member is connected to the gear to impart rotary motion from the drive to the gear and operates the drive means to move the latch into engagement with the locking means when the inertia weight prevents rotation of the gear to lock the reel against further protraction. In one embodiment, the gear connecting member connects the gear to the latch to move the latch into engagement with the locking mens. Programming means initiates rotation of the lock cup when the vehicle or webbing acceleration is sensed when the locking pawl is in a predetermined position relative to any one of the ratchet teeth so that the locking pawls engage the ratchet teeth at a predetermined location on the tooth so the rotation of the lock cup drives the locking pawl.

Alignment means may also be provided to align the pawl bounce prevention means during manufacture.

21 Claims, 14 Drawing Figures

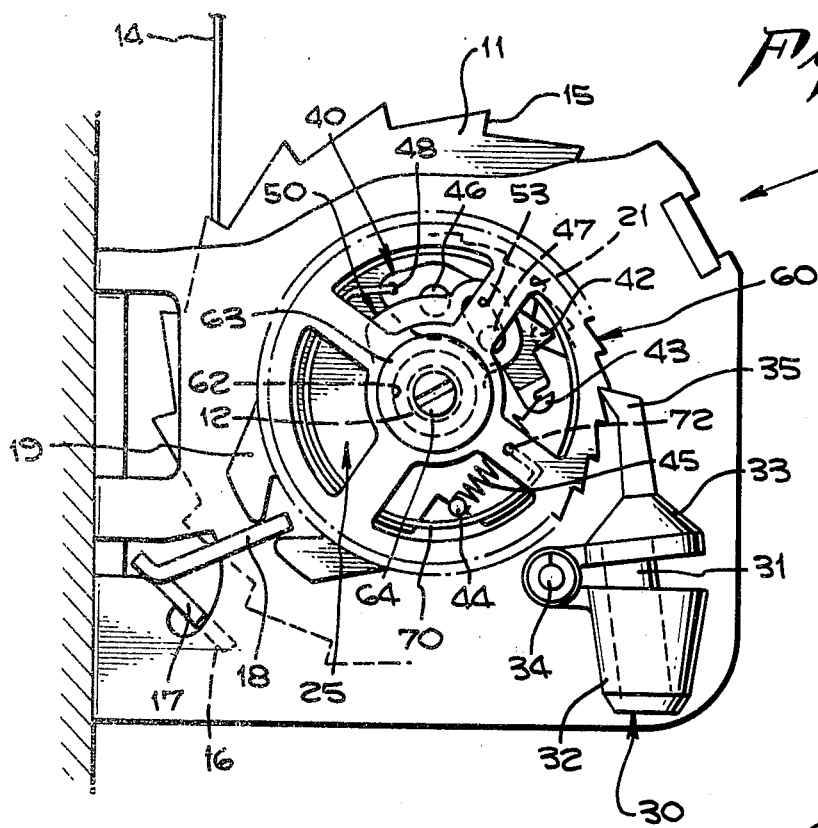
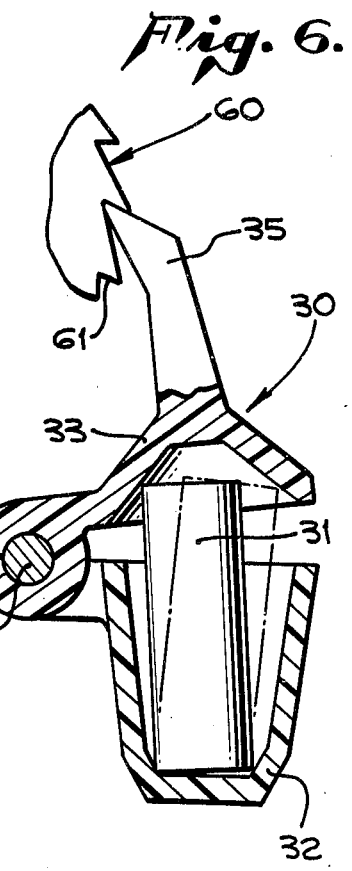
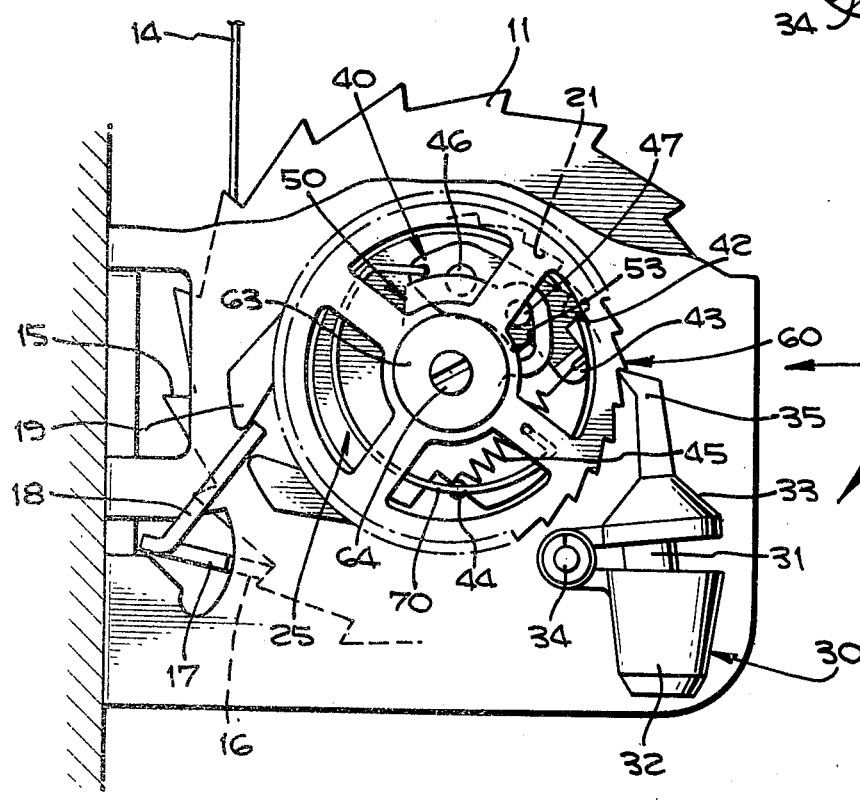

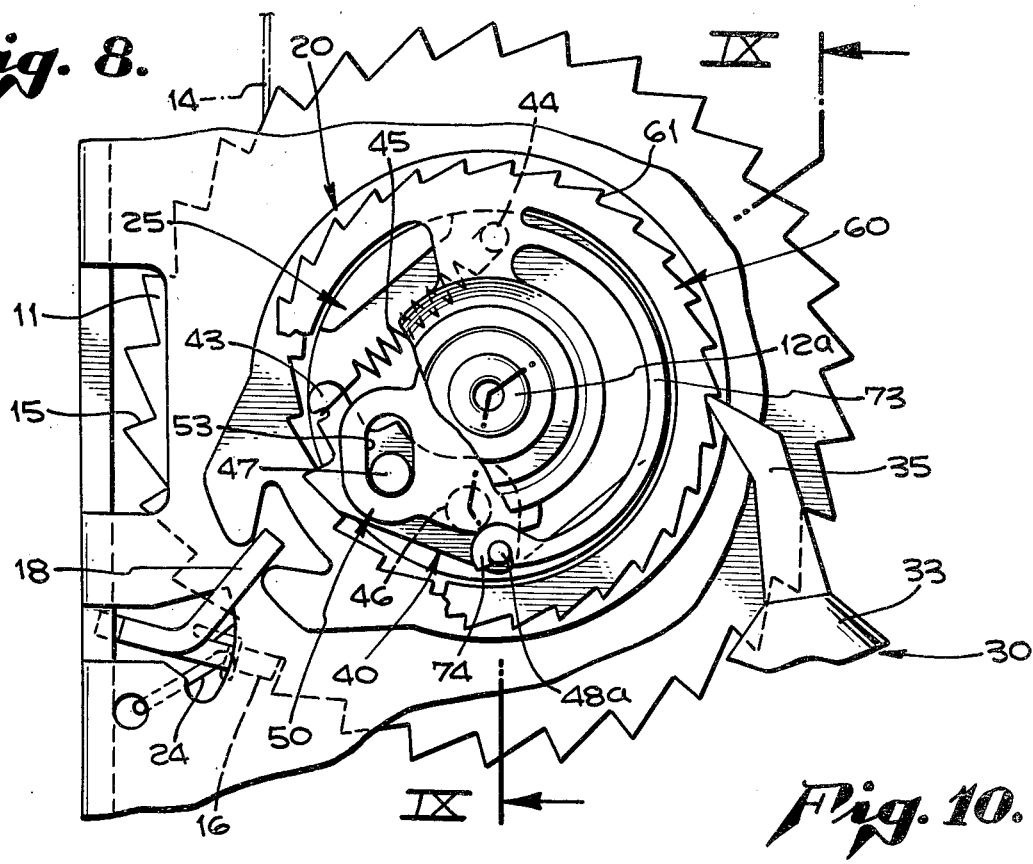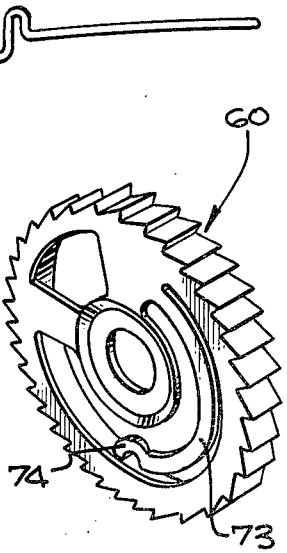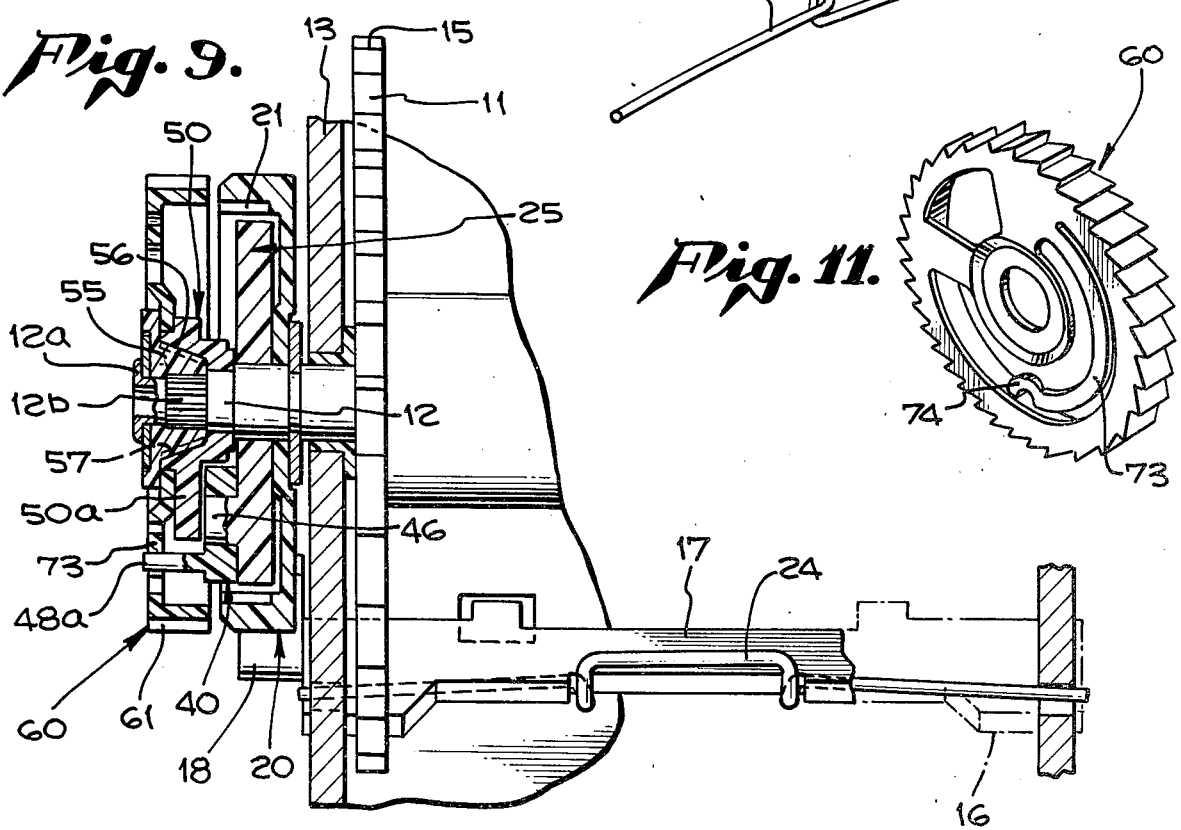

DUAL SENSITIVE RETRACTOR

BACKGROUND OF THE INVENTION

This application is a continuation-in-part of Serial No. 576,308, filed May 12, 1976 now abandoned.

It is desirable to have a retractor for safety belts which is normally free pulling. That is, the belt may be pulled from the retractor for adjustments thereto. However, during a crash the retractor locks to prevent continued protraction of the webbing.

Some retractors are sensitive to certain rotational speeds of the retractor reel, and when the speed is exceeded, the retractor locks preventing further protraction of the webbing. The drawback of this type of retractor is that it is easy to reach the lockup speed during the initial deployment of the safety belts. This results in the annoyance of having to carefully and slowly pull the webbing from the retractor so as not to overcome the lockup speed.

To overcome this problem, retractors are made sensitive to the acceleration of the belt and reel, and the present invention is sensitive to webbing and reel acceleration protraction. The following references teach retractors, many of which are associated with vehicle safety belts, which are sensitive to webbing acceleration:

| Pat. No.  | Patentee    | Date          |
|-----------|-------------|---------------|
| 700,763   | Ham         | May 27, 1902  |
| 888,418   | Burdon      | May 19, 1908  |
| 1,393,570 | Ricketts    | Oct. 11, 1921 |
| 2,845,234 | Cushman     | July 29, 1958 |
| 2,845,233 | Pfankuch    | July 29, 1958 |
| 3,122,338 | Whittingham | Feb. 25, 1964 |
| 3,292,744 | Replogle    | Dec. 20, 1966 |
| 3,323,749 | Karlsson    | June 6, 1967  |
| 3,446,454 | Kovacs      | May 27, 1969  |
| 3,450,368 | Glauser     | June 17, 1969 |
| 3,476,333 | Weman       | Nov. 4, 1969  |
| 3,666,198 | Neumann     | May 30, 1972  |
| 3,695,545 | Peters      | Oct. 3, 1972  |
| 3,700,183 | Rex         | Oct. 24, 1972 |
| 3,779,479 | Lindblad    | Dec. 18, 1973 |

In the Ham patent, for example, when the reel accelerates, the inertia mass tends to lag behind such acceleration and through a system of linkages pivots a latch into teeth to block rotation of the reel. The Burdon, Ricketts and Glauser patents are similar. Certain references have a gear of an internal gear train mounted on the inertia mass. In normal operation, the rotation of the reel drives the gear train but when the reel is accelerated, the movement of the inertia weight displaces one gear from the gear train causing locking of the retractor. Examples of this type of retractor are the patents to Pfankuch, Cushman, and Whittingham.

Other patents teach an inertia mass mounted on helical threads extending from the shaft of the reel. When the reel accelerates, the lagging of the inertia mass causes the mass to ride up the helical windings to engage the retractor's locking means. Examples of that teaching and other closely related teachings are shown in patents to Karlsson, Kovacs, Weman, Neumann, Rex and Lindblad. Other references teach slightly different ways of locking the retractor. For example, Replogle has an inertia weight attached to the belt which pivots about its center of gravity when the belt accelerates causing locking between the inertia plate and a plurality of stop members. In the Peters patent, the entire reel is displaced in an elongated shaft when the belt is accelerated.

Retractors for safety belts have also incorporated means for sensing the vehicle acceleration and attitude. These systems cause the retractor to lock when the vehicle undergoes a predetermined acceleration or flips or rolls over. There are a number of systems that have these so-called vehicle inertia sensitive retractors.

In certain situations, a vehicle inertia sensitive system or a web acceleration sensitive system alone will be inadequate to safety restrain vehicle occupants. Therefore, it has frequently been proposed to combine the two systems in a single retractor. Examples of some patents with both systems are as follows:

| Patent No. | Patentee  | Date           |
|------------|-----------|----------------|
| 3,203,641  | McFarlane | Aug. 31, 1965  |
| 3,343,763  | Spouge    | Sept. 26, 1967 |
| 3,430,891  | Burleigh  | Mar. 4, 1969   |
| 3,450,368  | Glauser   | June 17, 1969  |
| 3,552,676  | Weber     | Jan. 5, 1971   |
| 3,664,600  | Sargeant  | May 23, 1972   |
| 3,802,642  | Klink     | Apr. 9, 1974   |
| 3,819,126  | Stoffel   | June 25, 1974  |

In the McFarlane patent, an inertia plate rotates with the reel but rides on spheres which are held in slots in the inertia plate. When the rotation of the reel exceeds that of the inertia plate, the spheres roll relatively to the inertia plate and cause it to move axially with respect to the reel and engage locking means. The vehicle inertia sensitive feature includes a pendulum which engages the inertia disc to stop it causing the same relative motion between the reel and the inertia disc causing lockup of the retractor. Similar teachings are shown in patents to Spouge, Weber, Sargeant, Klink, and Stoffel.

The Burleigh patent has two sets of teeth attached to the reel. The first are fixed on the reel and engage the locking cam when the cam is displaced by the vehicle inertia sensitive means. A second set of flexible teeth is attached to the reel, and during sudden belt acceleration, the flexible teeth pivot outward to engage the locking cam to lock the reel.

One of the objects of the present invention is to provide a dual sensitive retractor which is an improvement over prior dual sensitive retractors such as are cited above. A more specific object is to provide the dual sensitive retractor to be formed from plastic parts where possible by transfering the load from the webbing to the retractor frame rather than through the vehicle inertia sensitive and belt acceleration sensitive mechanisms. A further object is to have a mimimum of parts and have both the vehicle inertia sensitive and the belt acceleration sensitive mechanisms utilize common parts. Another object is to prevent pawl bounce, rebounding of the locking pawl off the edge of a ratchet tooth.

A further object of the invention is to improve both the behicle inertia sensitive mechanism and the webbing acceleration sensitive mechanism to ensure locking of the retractor in response to the respective changes apart from improving the cooperation between the two systems.

SUMMARY OF THE INVENTION

The dual sensitive retractor of the present invention includes a reel having a shaft mounted on a frame for rotation and locking means for locking the reel against protractive rotation. The retractor includes an inertia mass mounted on the shaft for rotation with respect to the shaft and an inertia weight responsive to changes in the inertia of the vehicle. The restractor has been improved by the provision of a latch and means for mounting the latch for engaging the locking means to prevent webbing protraction. Drive means is driven by the shaft and is connected to the latch for imparting rotation from the shaft to the inertia mass and for moving the latch into engagement with the locking means when the webbing acceleration rotates the shaft faster than the inertia mass. A grear is mounted on the shaft for rotation with respect to the shaft and is engageable by the inertia weight to prevent its rotation with the shaft. A gear connecting member is connected to the gear for operating the drive means for moving the latch into engagement with the locking means when the inertia weight prevents rotation of the gear to lock the reel against further protraction. Pawl bounce prevention means may be provided to insure that the locking means engages the reel in front of one ratchet tooth on the reel rather than striking the edge of a ratchet tooth and rebounding off.

BRIEF DESCRIPTION OF THE DRAWINGS

FIGS. 2 and 3 show the gear 60 cut-away so that the structure of the inertia mass, latch and cam are more visible.

FIG. 4 is a side view of the dual sensitive retractor of the first embodiment showing the vehicle inertia sensitive mass initially contacting the gear means immediately prior to retractor lockup. The gear 60 is shown in FIGS. 4 and 5.

FIG. 5 shows the dual sensitive retractor immediately after engagement of the gear means by the vehicle inertia sensitive mass whereby the retractor is locked.

FIG. 6 is a detailed sectional view of the vehicle inertia sensitive mass used in conjunction with present dual sensitive retractor.

FIG. 8 is a side view of the second embodiment of the dual sensitive retractor in the locked condition.

FIG. 9 is a sectional view of the retractor taken along the plane IX—IX in FIG. 8.

FIG. 10 is a perspective view of the spring which biases the locking pawl out of engagement with the ratchet teeth.

FIG. 11 is a perspective view of a modified form of the gear means which is shown in the second embodiment of the retractor.

DETAILED DESCRIPTION OF THE PREFERRED EMBODIMENT

Figure 1:
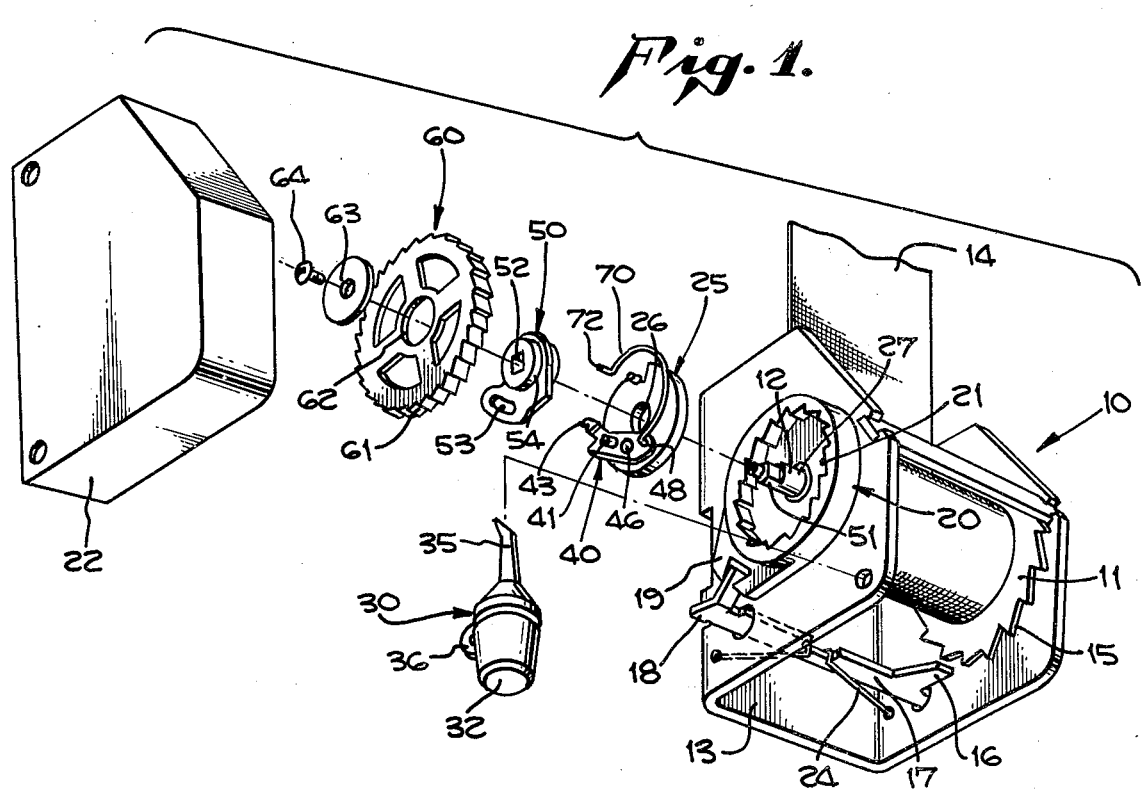
FIG. 1 is an exploded view of one embodiment of the dual sensitive retractor of the present invention.

A dual sensitive retractor for use in a vehicle which prevents protraction of the webbing when either a predetermined vehicle acceleration or webbing acceleration occurs includes a reel and a shaft rotatably mounted on the frame. In the first exemplary embodiment, such retractor is indicated at 10 and includes reel 11 having a shaft 12 rotatably mounted on generally U-shaped frame 13. Frame 13 is mounted on vehicle 9. (FIGS. 2-5). A leaf spring (not shown) winds the reel in the counterclockwise direction (FIGS. 1-5) to wind webbing 14 on the reel 11.

Figure 7:
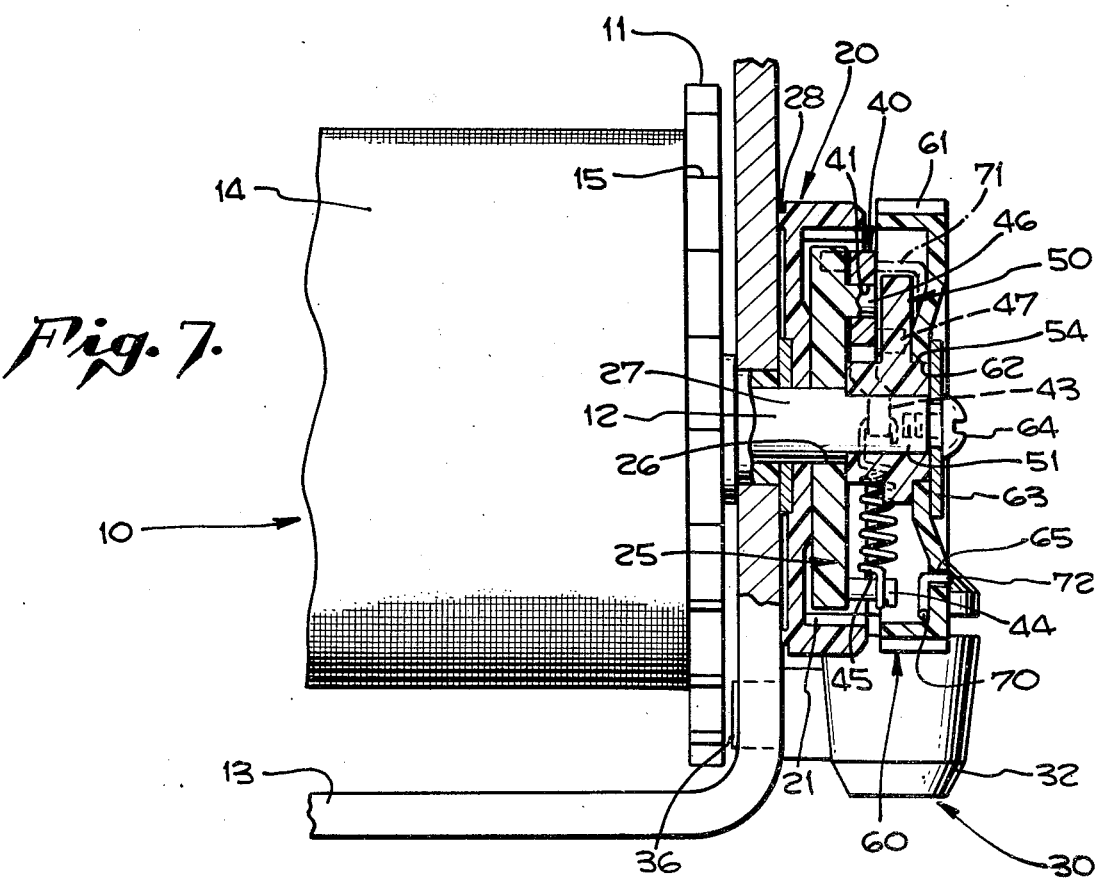
FIG. 7 is a sectional view taken through the plane VII—VII of FIG. 2 and shows the relationship of the parts of the vehicle inertia sensitive means and the webbing acceleration sensitive means to the dual sensitive retractor of the present invention.
Figure 13:
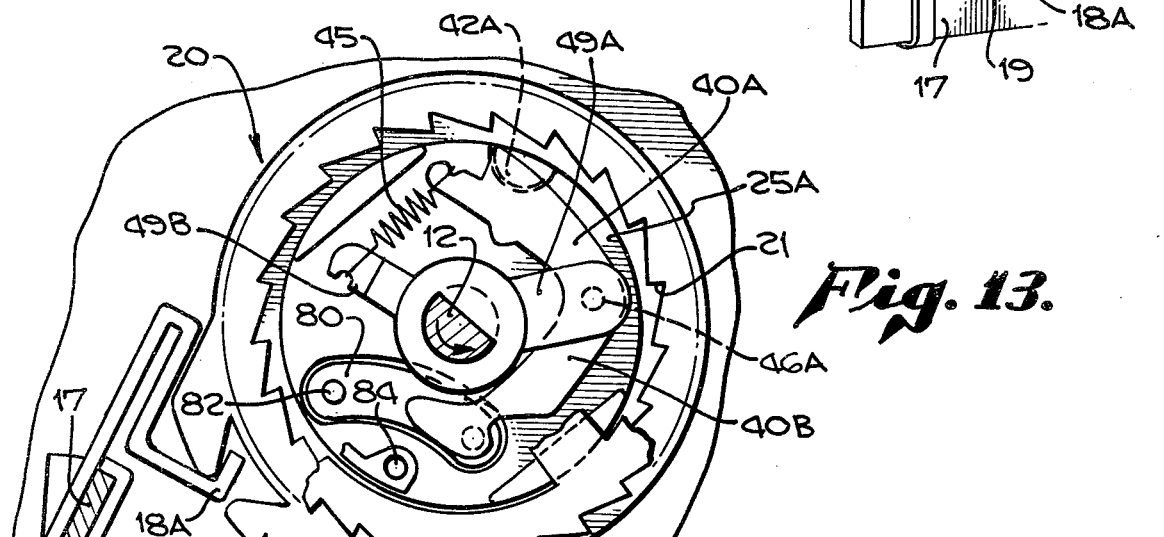
FIG. 13 is a side view of the modified embodiment of the dual sensitive retractor showing the retractor in its normal condition.
Figure 14:
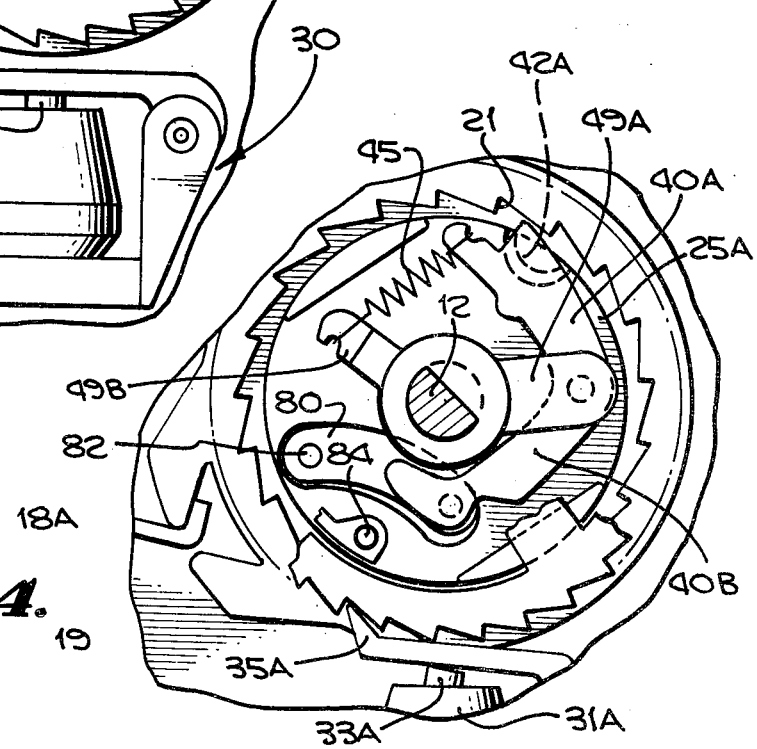
FIG. 14 is a side view similar to FIG. 13 but with the retractor about to lock.

Locking means are provided for locking the reel to prevent protractive rotation of the reel. In the first exemplary embodiment, the locking means includes ratchet teeth on both sides of the reel (FIGS. 1 and 7). Locking pawls 16 are mounted on lockbar 17 which is pivotally mounted on the frame in a known manner to engage the ratchets and prevent protractive rotation (clockwise in FIGS. 1-5) by the reel. The locking means includes a locking lever 18 which fits between extensions 19 of lock cup 20. A small clockwise rotation of lock cup 20 causes extension 19 to pivot lever 18 pivoting locking pawls 16 on lockbar 17 to engage ratchets 15. Spring 24 which is attached at one end to frame 13 biases the lockbar 17 to a position where the pawls 16 do not engage ratchets 15. Therefore, it can be seen that the locking pawls must be positively driven by the extensions 19 in order to engage the ratchets. In the modified embodiment (FIGS. 12-14), locking lever 18 has been replaced with a spring connection 18A to lockbar 17.

An inertia mass is mounted on the shaft for rotation with respect to the shaft. In the exemplary embodiment (FIGS. 1, 7 and 12) the inertia mass 25 is mounted on shaft 12 with bore 26 of mass 25 fitting over the cylindrical portion 27 of shaft 12.

It should be noted that the lock cup 20 is also mounted for rotation with respect to shaft 12 about the cylindrical surface 27 thereof, and a narrow ridge 28 on the rear face of lock cup 20 decreases friction between the lock cup 20 and the frame 13 (FIG. 7).

An inertia weight is provided which is responsive to changes in the inertia of the vehicle. In order to maintain continuity in the description, the inertia mass is referred to as element 25, (25A in FIGS. 12-14) and the inertia weight, described in more detail below, is referred to as element 30 (30A in FIGS. 12-14). In the exemplary embodiments, the inertia weight 30 generally includes a cylindrical metal weight 31 mounted in housing 32 which is fixed by mounting portion 36 to frame 13. Cap 33 which is connected at pivot 34 to housing 32 includes a lever 35. When the vehicle undergoes a change in inertia, weight 31 shifts from its normal position (FIGS. 2 and 3) to an off balanced position (FIGS. 4,5 and 6). In the off balance position, the weight 31 contacts the underside of cap 33 to pivot the lever 35 upward into the path of teeth 61 on gear means 60. In the modified embodiments (FIGS. 12-14), inertia weight 30 has been replaced by inertia mass 30A which is similar to that shown in application Ser. No. 603,519, filed Aug. 11, 1975. Pendulum 31A on base 36A moves in response to vehicle acceleration causing shaft 33A to move upward pivoting locking lever 35A into engagement with gear means 60.

Latch means and means for mounting the latch means are provided for engaging the locking means to prevent webbing protraction, and interconnecting means connect the latch means and the inertia mass for normally concurrent rotation. In the first and second exemplary embodiments, particularly FIGS. 1–5 and 7, the interconnecting means mounts latch means 40 on the inertia mass 25 with its opening 41 pivoting on pivot pin 46. The latch portion 42 of latch means 40 is adapted to engage inwardly facing teeth 21 of lock cup 20 (FIGS. 2–5), and when such engagement occurs, the lock cup is rotated clockwise (FIGS. 3 and 5) to pivot lever 18 and thereby cause engagement of pawls 16 with the ratchet wheel 15. In the modified exemplary embodiment, latch means 40A is mounted on shank 49A with pin 46A through bearing 41A. The interconnecting means, described in more detail below includes extension 40B, linkage 80 and post 84 to connect latch means 40A with inertia mass 25A. Latch portion 42A operates similarly to latch portion 42.

The latch means 40 also includes an arm 43 (43A in the modified embodiment) and a calibration spring 45 that, as part of resilient means, connects arm 43 in the first and second embodiments with a small pin 44 on the inertia mass to bias latch means 40 inwardly toward the shaft and away from contact between latch portion 42 and teeth 21 of lock cup 20. Therefore, until the force of calibration spring 45 is overcome in a manner set forth hereinafter, the latch portion 42 does not engage teeth 21, and the reel does not lock but remains free to rotate.

In the modified embodiment, spring 45 is connected between arm 43A and an extension 49B on shank 49A. Spring 45 biases latch means 40A inwardly toward the shaft so that latch portion 42A does not contact teeth 21 of lock cup 20 until the force of spring 45 is overcome.

Drive means driven by the shaft and connected to its latch means imparts rotation from the shaft to the latch means and through the interconnecting means to the inertia mass and moves the latch into engagement with the locking means. In the first and second embodiments, the drive means comprises cam means fixed to the shaft and means connecting the cam and the latch impart rotation from the shaft to the inertia mass and move the latch into engagement with the locking means when webbing acceleration accelerates the shaft faster than the inertia mass. In the first exemplary embodiment, particularly FIGS. 2 and 3, cam means 50 is mounted on shaft 12 about non-cylindrical portion 51 of shaft 12 which mates with a similar shaped opening 52 in cam means 50. In this manner, cam means 50 is fixed to the shaft 12 and rotates therewith.

Pin 47 which is fixed to latch means 40 fits in cam slot 53 of the cam means 50. It can therefore be seen that there is a resilient connection between the inertia mass 25 and shaft 12 permitting shaft 12 to rotate with respect to inertia mass 25 against the resiliency yet causing the mass 25 to be rotated by shaft 12. The resilient connection functions as follows in the first and second exemplary embodiments. Rotation of shaft 12 causes rotation of cam means 50. This imparts a force from the cam slot 53 against pin 47 in the cam slot. This force tends to rotate latch means 40 in a counterclockwise direction (FIGS. 2 and 3) about pivot pin 46 when the shaft and cam rotate in a clockwise direction due to protraction of webbing 14. An opposite force on latch means 40 is applied by the calibration spring 45 acting on arm 43. As long as the force on the latch means from the calibration spring 45 is greater than the force from the cam means 50, the rotation of shaft 12 is transmitted to pin 47, then by latch 40 to pivot pin 46 on the inertia mass 25. This transmits rotation from the shaft to inertia mass 25 and causes it to rotate with rotation of shaft 12. It is also noted that as the inertia mass rotates, calibration spring 45 is pulled in a clockwise direction by the spring connection 44 on inertia mass 25 which increases the force on arm 43 of latch means 40 resisting pivoting about pin 46 into engagement with the lock cup 20.

If belt 14 is accelerated rapidly as would happen during a crash, a number of things occur in the mechanism. The shaft which is fixed to the reel accelerates generally instantaneously to match the webbing acceleration. However, because the inertia mass 25 receives its rotary motion from resilient connections and because it is heavy and has mass, the inertia mass 25 lags behind the shaft and therefore lags behind the cam 50. This lagging causes the cam slot 53 to move relative to pin 47 (note differences in FIGS. 2 and 3) which pivots latch means 40 about pin 46 overcoming the opposite force from calibration spring 45. Latch portion 42 thereafter engages a tooth 21 on the inside of lock cup 20, pivoting the lock cup in a clockwise direction to pivot locking pawls 16 into ratchet teeth 15 to stop further protraction of the reel.

In the modified exemplary embodiment, the drive means comprises the following elements. Shank 49A fixed to shaft 12 rotates therewith. This rotates latch member 40A about the shaft. Extension 40B of latch 40A is connected by pin 81 to linkage 80 which in turn is mounted on pin 82 in cavity 83 on inertia mass 25A. The latch is also driven by spring 45 through extension 49B. Therefore, the shaft rotates latch 40A to rotate linkage 80 to rotate inertia mass 25A.

The drive means rotates the inertia mass through a resilient connection. Linkage 80 and shank 49A tend to pivot latch 40A into teeth 21 of lock cup 20. However, spring 45 biases the latch away from the teeth, and prevents engagement of the teeth by the latch unless the force of calibration spring 45 is overcome. Therefore, the drive means drives the inertia mass through resilient connection.

In the modified embodiment, rapid belt acceleration generally instantaneously accelerates the shaft which is fixed to the reel. The shaft rotates counterclockwise. However, because the inertia mass 25 receives its rotary motion from resilient connections, the massive inertia mass 25 lags behind the shaft. This causes linkage 80 to pivot latch 40A clockwise about pin 46A moving against the force of spring 45 thereby moving from the FIG. 13 to the FIG. 14 position. Latch portion 42A thereafter engages a tooth 21 on lock cup 20.

Gear means and means mounting the gear means on the shaft for rotation with respect to the shaft are provided. The gear means is engageable by the inertia weight to prevent its rotation with the shaft. The operation and function of the gear means is shown more clearly in FIGS. 4 and 5 in the first and second exemplary embodiments. However, referring briefly to FIGS. 1 and 7, gear means 60 has a central opening 62 through which bushing 54 on cam means 50 extends. Gear means 60 is free to rotate with respect to cam means 50 and therefore is free to rotate with respect to shaft 12. Washer 63 fits over the central area of cam means 60 and a screw 64 which is screwed into shaft 12 holds washer 63, gear means 60, cam means 50, inertia mass 25 and lock cup 20 in the correct position with respect to the shaft 12. Alternatively, the shaft 12 may have a bore so that the shaft can be flared as at 12a (FIG. 9) by a machine. The flared portion 12a replaces the need for screw 64.

Figure 12:
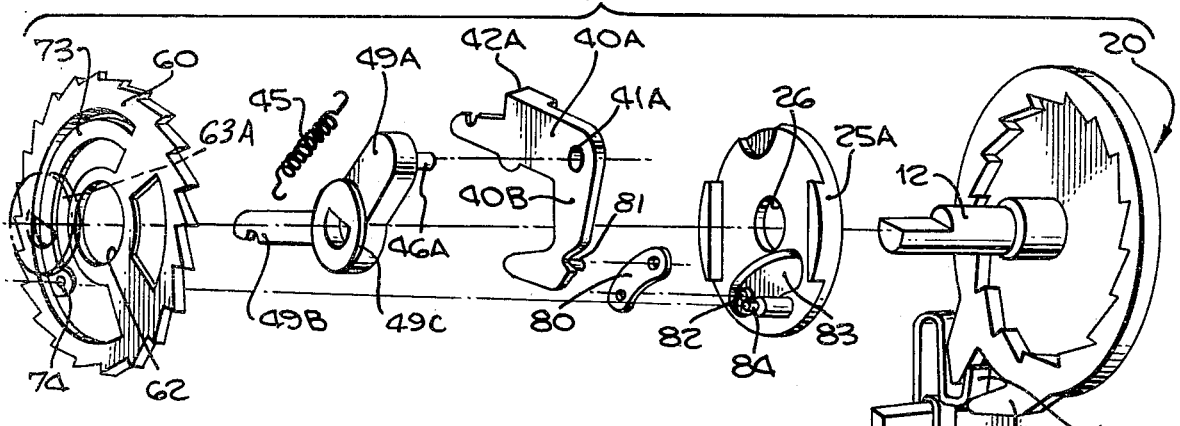
FIG. 12 is an exploded view of a modified embodiment of the present invention.

In the modified embodiment, central opening 62 of gear means 60 is mounted on bushing 49C on shank 49A (FIG. 12). The gear is free to rotate on bushing 49C. Washer 63A with a D-shaped opening is forced over the D-shaped end of shaft 12 to hold the gear on the shaft, and the washer also holds the other parts on the shaft.

Yielding or gear connecting means in a gear driving relation between the latch means and the gear means imparts rotary motion from the latch means through the yielding means to the gear means and moves the latch means into engagement with the locking means when the inertia weight prevents rotation of the gear means to lock the reel against further protraction. In the first and second exemplary embodiments, the gear connecting means is connected to the latch means which is mounted on the inertia mass. In the modified exemplary embodiment, the gear connecting means is connected directly to the inertia mass.

In the first exemplary embodiment (FIGS. 4 and 5), gear connecting or yielding means 70 is a spring in the shape of a C and has a down turned portion 71 extending into a spring receiving opening 48 on the latch means 40 and an up-turned portion 72 extending into an opening 65 in the gear means.

In the second exemplary embodiment, the gear 60 has the C-spring as a molded part thereof. (FIGS. 8 and 11). This C-spring section 73 has a hooked end 74 which engages a pin 48a on the latch means 40. The modified embodiment utilizes a C-spring similar to that of the second embodiment, molded as part of gear 60. The hooked end 74 engages post 84 on inertia mass 25A.

In the first and second exemplary embodiments, when inertia mass 25 rotates, it revolves latch means 40 around shaft 12 so that the C-spring revolves about the shaft imparting rotary motion to the gear means 60. Therefore, in normal operation, the gear means 60 rotates with the shaft 12. However, during a change in vehicle inertia, the inertia weight 30 engages the teeth 61 of gear means 60 and prevents its further rotation. A small protraction of the webbing 14 causes the shaft 12 to rotate in the clockwise direction, and because latch means 40 continues to revolve around shaft 12, energy is absorbed in the spring 70. (FIG. 5)

The stored energy from spring 70 acts on opening 48 on latch means 40. The opening 48 is on the other side of the pivot pin 46 from the latching portion 42, and the force from spring 70 tends to rotate latch means 40 about pivot 46 against the counter force of calibration spring 45. It is recognized that any slight webbing protraction rotates the cam means 50 a sufficient distance to allow the pivoting of the latch means 40 into the locking means. Also, the cam slot 53 may be made wider than the pin 47 to allow some pivoting of the latch means 40 without any rotation of the cam means 50.

The spring means 70 also acts on the latch in a second manner. The effect of the non-rotating gear means 60 causes a force through spring means 70 on latch means 40 against revolving by the latch means 40 about shaft 12. This force tends to cause inertia mass 25 to lag with respect to rotating cam means 50 which causes locking of the retractor in the same manner that occurs when the webbing acceleration sensitive mechanism causes locking of the retractor.

In the modified exemplary embodiment, the C-spring 73 also revolves about the shaft from rotation of the inertia mass. When inertia weight 30 stops gear means 60, spring 73 acting on post 84 slows inertia mass 25 relative to the shaft. This causes the latch means to pivot about pin 46A in a manner set forth above.

The resiliency of the C-spring is necessary in order to provide resilience between the gear means 60 and the latch means 40 so that the latch can rotate the lock cup 20 when the gear means 60 is stopped.

When the inertia weight 30 is returned to its normal position so that it is not engaging the gear means 60, the spring means 70 causes the relatively lightweight gear means to snap back to the FIG. 4 position. In that position in the first and second embodiments, there is a slight force from the C-spring in the clockwise direction which assists the calibration spring 45 in maintaining the latch 42 disengaged from the lock cup 21 and helps cause positive and rapid disengagement therefrom when the inertia weight 30 releases the gear means 60.

Figure 2:
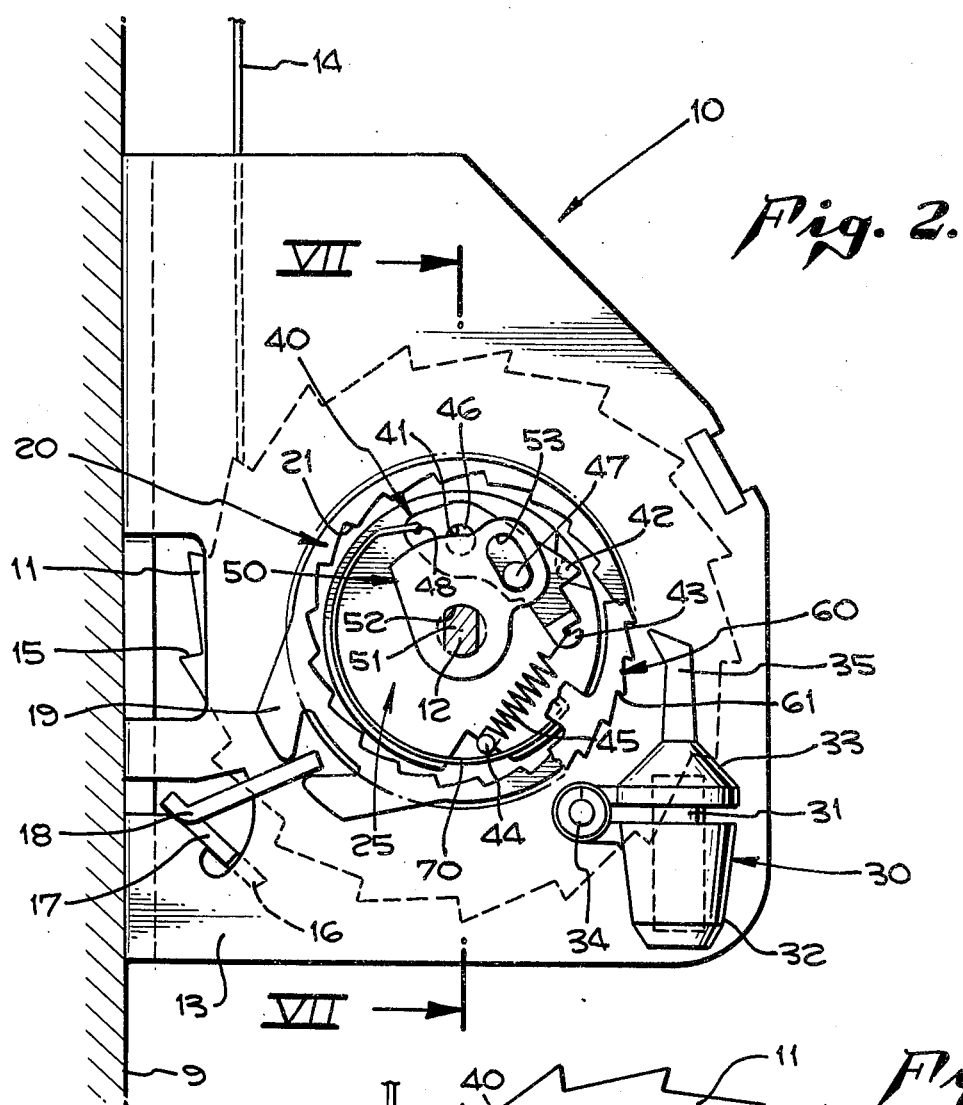
FIG. 2 is a side view of the first embodiment of the dual sensitive retractor and shows the retractor in its normal condition, that is free spooling without being prevented from protractive rotation by either vehicle inertia sensitive means or webbing acceleration sensitive means.
Figure 3:
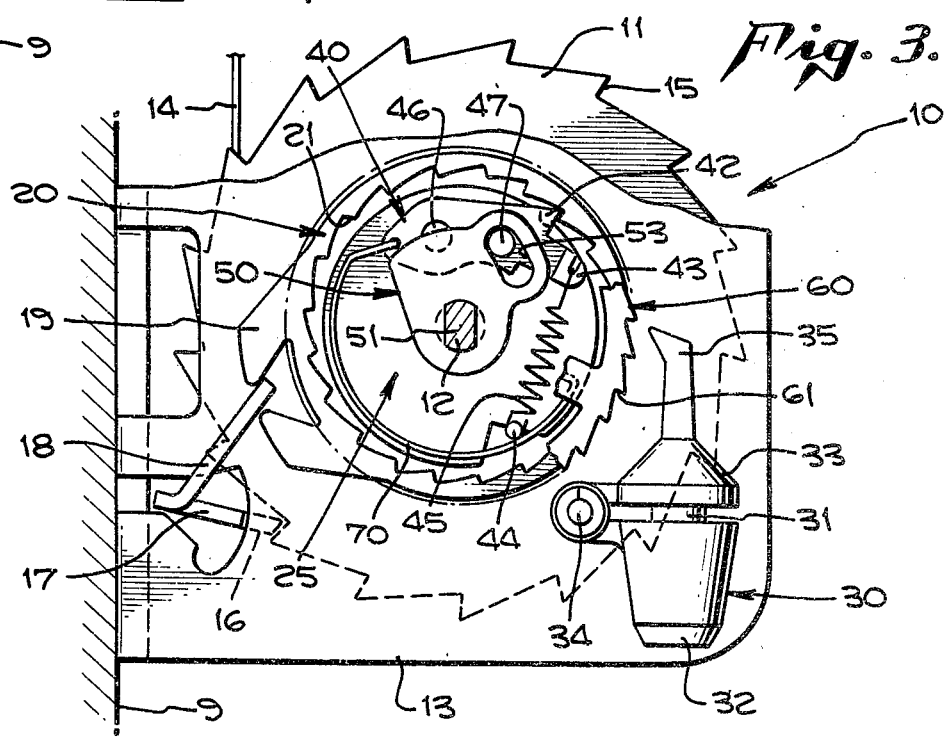
FIG. 3 is a partial side view, similar to that shown in FIG. 2 in which the webbing acceleration sensitive mechanism has locked the retractor.

Once the latch means disengages lock cup 20, and the vehicle and webbing sensitive means are in their normal state, force from spring 24 on lockbar 17 (not shown in FIGS. 12-14) pivots locking pawls out of engagement with ratchet teeth 15 and pivots arm 18 (or spring 18A in FIGS. 12-14) to return lock cup 20 to its normal position (FIGS. 2 and 4).

For purposes of the following discussion, the vehicle inertia sensitive means and the webbing sensitive means is referred to as the emergency sensing means. Pawl bounce prevention means is operatively connected to the emergency sensing means to initiate the engagement of the ratchet teeth by the locking pawl without pawl bounce of the pawl off the edge of a ratchet tooth. The pawl bounce prevention means includes programming means for initiating rotation of the lock cup by the emergency sensing means when the locking pawl is in a predetermined position relative to any one of the ratchet teeth so that the locking pawl engages the ratchet tooth at a predetermined location on the tooth as the rotation of the lock cup drives the locking pawl. Pawl bounce is a condition which occurs when the pawl 16 engages the edge 15a of the ratchet tooth. When that condition occurs, the edge 15a of the rapidly rotating reel will rotate the pawl 16 in a clockwise direction (FIGS. 2-5, 8) and before there is a reengagement by the emergency sensing mechanism, the reel may have rotated a sufficient amount to loosen the belt and provide an unsafe condition. Therefore, it is advantageous to eliminate pawl bounce.

The present invention eliminates pawl bounce in the first and second embodiments by having equal numbers of teeth 21 on the inside of the lock cup as there are teeth 15 on the outside of the reel. This is shown particularly well in FIG. 8. Note that the rotation of shaft 12 is transmitted through cam means 50 to the pin 47 on the latch means 40. The rotation of the shaft is tied to the rotation of the reel. Therefore, during engagement of the lock cup 20 by the latch 40, the lock cup 20 and the reel 11 rotate together. By providing an equal number of teeth 21 on the lock cup as there are ratchet teeth 15 on the reel 11, the position of the particular tooth 15 which will be engaged by the locking pawl 16 will always be the same relative to pawl 16 at the same stages of locking. If the device is calibrated so that the locking pawl 16 meets the ratchet tooth 15 in a manner shown in FIG. 8, locking of the pawl 16 with any ratchet tooth 15 would occur in the same manner.

In the first embodiment, shaft 12 is machined and fixed to the reel in such a way that the angle of cam 50 as it is held through hole 52 on the machined end of the shaft 12 is aligned with respect to the ratchet teeth 15 of the reel 11. The second embodiment (FIG. 9) is less costly. It includes alignment means for aligning the emergency sensing means on the shaft. The emergency sensing means comprises latch 40 and latch driving means for pivoting the latch into engagement with the lock cup in response to an emergency signal. Means are provided for mounting the latch driving means for limited rotation on the shaft whereby the latch driving means can assume an orientation on the shaft such that the latch rotates the lock cup to its extreme rotation when the locking pawl means engages a ratchet tooth at a predetermined location on the tooth. Means are also provided to fix the latch driving means on the shaft at that orientation.

In the embodiment of FIGS. 8 and 9, the latch driving means includes cam 50a, modified to engage the shaft 12 in a manner shown in FIG. 9. The shaft 12 is modified to have teeth means 12b on the outside thereof and cam 50a also has teeth means (not shown) on the outside of opening 56 on the inside of cam 50. Cam 50 is fixed to the shaft 12 but prior to the insertion of the cap 55, the function of which is described hereinafter, some "give" is allowed between the cam 50 and shaft 12.

The assembler who receives the retractor without cap 55 jerks the belt to cause lockup and pulls sufficiently hard so that the shaft rotates to its extreme position relative to the cam. In this, the aligned position, the locking of the lock cup causes the locking pawl to correctly engage a ratchet tooth 15 on the reel 11. In order to maintain the relationship between the shaft and the cam, a soft plastic cap 55 is inserted over the shaft 12 and in the opening 56 in the cam. The soft nature of the plastic allows the teeth 12b on the shaft and the teeth on the inside of the cam to grip the cap and fix the position of the cam and shaft. The cap may be designed to eliminate the need for washer 63. Therefore, pawl bounce is prevented and a simplified means for aligning the pawl bounce prevention means are also provided.

If the parts are made to looser tolerances, alignment is more difficult. Therefore, in the modified embodiment, the locking lever 18 is replaced with spring 18A connected to lockbar 17. Therefore, if pawl bounce occurs, the spring absorbs the bounce and urges the locking pawls into engagement with the ratchet teeth.

There are important consequences of designing the dual sensitive retractor of the present invention in the manner set forth above. Neither the latch means 40 or the cam means 50, in the first and second exemplary embodiments, the latch 40A, linkage 80 or shank 49A in the modified embodiment or the gear means 60 or the lock cup 20 in all embodiments bear the load in preventing protraction of the webbing. Therefore, these parts can be inexpensively fabricated from plastic. When the locking pawls 16 are pivoted into engagement with the ratchet 15 on the reel 11, the load is transferred to the frame. The other parts merely serve to pivot the locking pawls into engagement with the ratchet. In the preferred embodiment, the inertia mass 25 and the weight 31 are metal in order to have higher amounts of inertia and the springs are also metallic because low cost, inexpensive metallic springs are readily available.

A plastic cover 22 is provided in the exemplary embodiment to cover the mechanism to prevent dirt from interfering with the operation of the mechanism.

It will be understood that various modifications and changes may be made in the configuration of the dual sensitive retractor described above which may come within the spirit of this invention and all such changes and modifications coming within the scope of the appended claims are embraced thereby. Different features of the various embodiments could be substituted for features in other embodiments within the spirit of the invention.

I claim:

1. In a dual sensitive retractor for preventing webbing protraction when the webbing undergoes a predetermined acceleration and/or the vehicle on which the retractor is mounted undergoes a predetermined change in inertia, the retractor including a reel having a shaft mounted on a frame for rotation and locking means for locking said reel against protraction, the retractor including an inertia mass mounted on the shaft for rotation with respect to the shaft, and an inertia weight responsive to changes in the inertia of the vehicle, the improvement comprising the provision of:

latch means and means for mounting said latch means for engaging said locking means to prevent webbing protraction;

interconnecting means for connecting said latch means and said inertia mass for normally concurrent rotation;

drive means driven by said shaft and connected to said latch means for imparting rotation from the shaft to said latch means and through said interconnecting means to the inertia mass and for moving said latch means into engagement with said locking means when webbing acceleration rotates the shaft faster than the inertia mass;

gear means and means mounting said gear means on the shaft for rotation with respect to the shaft, said gear means being engageable by said inertia weight to prevent its rotation with the shaft; and yielding means in a gear driving relation between said latch means and said gear means for imparting rotary motion from the latch means through the yielding means to the gear means and for moving said latch means into engagement with said locking means when said inertia weight prevents rotation of said gear means to lock said reel against further protraction.

2. The improvement of claim 1 further comprising: said gear means having teeth thereon, and lever means including a tooth thereon movable into the teeth of the gear means in response to movement of said weight during acceleration of the vehicle, said teeth on said gear means and said tooth on said lever insuring positive engagement therebetween.

3. The improvement of claim 1 wherein the latch means is mounted on the inertia mass, the drive means comprises cam means fixed to the shaft and contacting the latch means for imparting rotation from the shaft to the inertia mass and for moving the latch means into engagement with the locking means when webbing acceleration rotates the shaft faster than the inertia mass, and wherein the gear connecting means connects the latch means with the gear means to impart rotary motion from the latch means to the gear means and for moving the latch means into engagement with the locking means.

4. The improvement of claim 3 wherein said latch means includes a latching portion which engages said locking means, a pivot connecting said latch means with said inertia mass, and connecting means opposite said pivot on said latch means for connecting said spring means to said latch means for pivoting the latching portion about said pivot when said gear means is stopped.

5. The improvement of claim 4 wherein said yielding means comprising spring means of resilient material in the shape of a C, said resilient material being located generally above at least part of the circumference of said inertia mass for pivoting said latch means.

6. In the retractor of claim 4, said reel including ratchet teeth and said locking means including a locking pawl movable into engagement with said ratchet teeth, the improvement further comprising said locking means including a lock cup with inwardly facing teeth thereon, means connected to said lock cup engaging said locking pawl whereby rotation of said lock cup drives said locking pawl into engagement with said ratchet wheel, said latch portion engaging said teeth on said lock cup to rotate the lock cup so that the lock cup positively moves said locking pawl into engagement with said ratchet wheel.

7. In a retractor for winding webbing thereon and preventing protraction of the webbing when the webbing protraction exceeds a certain acceleration including a reel having a shaft rotatably mounted on a frame, locking means for preventing protractive rotation of the reel, an inertia mass mounted on the shaft for rotation with respect to the shaft, latch means pivotally mounted on the inertia mass and pivotable into engagement with said locking means for locking said reel, and resilient means resiliently connecting said inertia mass to said shaft to rotate said inertia mass with said shaft permitting said shaft to rotate with respect to said inertia mass against said resiliency, the improvement comprising the provision of:
cam means fixed to the shaft including an arcuate slot and pin means extending from said latch means for engagement within said slot for lifting said pin means to pivot said latch means into engagement with said locking means when the inertia mass rotates slower than the shaft during acceleration of webbing protraction to lock said reel and vehicle inertia sensitive means responsive to acceleration of said vehicle and means for connecting the vehicle sensitive means to said latch means when a predetermined vehicle acceleration occurs to pivot said latch means into engagement with said locking means.

8. The improvement of claim 7 further including ratchet teeth on said reel, said locking means including locking pawl means engaging said ratchet teeth and programming means between said latch means and said locking pawl means to program the locking of said locking pawl means into the ratchet teeth at one of a plurality of predetermined locations so that the bounce of the locking pawl means from a tooth of said ratchet during locking of the retractor is prevented.

9. The improvement of claim 8 wherein said programming means comprises teeth on said locking means for being engaged by said latch means, said locking means and said reel having an equal number of teeth.

10. The improvement of claim 9 wherein said programming means comprises alignment means for aligning the latch driving means with respect to the ratchet teeth for driving the latch into engagement with the teeth on said locking means when any one of the ratchet teeth are at a predetermined location relative to the locking pawl.

11. The improvement of claim 10 further including alignment means insertable between said latch driving means and said shaft the first time the retractor is locked to prevent rotation of the latch driving means relative to the shaft after the latch driving means is positioned with respect to the ratchet teeth when the retractor is locked.

12. The improvement of claim 11 wherein said alignment means includes mounting means on the latch driving means to allow small amounts of rotation of the shaft with respect to the latch driving means, shaft gripping means on the shaft, latch driver gripping means on the latch driving means, and cap means insertable between the latch driver gripping means and the shaft gripping means to prevent rotation of the shaft relative to the latch driving means.

13. In a dual sensitive retractor for use in a vehicle which prevents protraction of webbing when either a predetermined vehicle acceleration or webbing acceleration occurs including a reel on a shaft rotatably mounted on a frame, locking means for locking the reel to prevent protractive rotation of said reel, an inertia mass mounted on the shaft for rotation therewith, resilient means associated with the shaft to drive said inertia mass in rotation with rotation of said shaft whereby constant speed rotation of the shaft causes constant speed rotation of the inertia mass and accelerating rotation of said shaft causes said inertia mass to rotate at a slower speed than the shaft, latch means pivotally mounted for engaging the locking means to lock the reel, the improvement comprising the provision of:
differential sensitive means responsive to a differential in rotational speed of the inertia mass and the shaft to pivot the latch means into engagement with said locking means; and
vehicle inertia sensitive means and means for operably connecting it to said latch means to pivot the latch means into engagement with the locking means on change of vehicle inertia.

14. The improvement of claim 13 wherein the vehicle inertia sensitive means comprises gear means mounted for rotation on said shaft, a weight sensitive to changes in the vehicle inertia and means for mounting the weight to intersect the gear means upon changes in the vehicle inertia to prevent rotation of the gear means, and gear connecting means connecting said gear means with the inertia mass for transmitting rotation of the inertia mass to the gear means and for moving the latch means into engagement with said locking means when the gear means is prevented from rotation by said weight.

15. The improvement of claim 14 wherein the gear connecting means is connected directly from the gear means to the inertia mass.

16. The improvement of claim 15 wherein the latch means is eccentrically mounted with respect to the shaft, the improvement further comprising linkage means pivotally mounted on the inertia mass and being connected to the latch means whereby when the inertia weight stops the gear means, the gear connecting means slows rotation of the inertia mass whereby the linkage means pivots the latch into engagement with the locking means.

17. The improvement of claim 14 wherein the latch means is pivotally mounted on the inertia mass.

18. The improvement of claim 17 wherein said latch means includes a latching portion which engages said locking means, and connecting means opposite said pivot on said latch means for connecting said gear connecting means to said latch means for pivoting the latch portion about said pivot when said gear means is stopped.

19. The improvement of claim 14 wherein said gear connecting means comprises resilient material in the shape of a C, said resilient material being locted generally above at least part of the circumference of said inertia mass for pivoting said latch means.

20. The improvement of claim 19 wherein said resilient material is of the same material and is a part of said gear means.

21. A method of programming a retractor so that the locking pawl is prevented from intersecting the edge of ratchet teeth, the retractor comprising a reel with ratchet teeth thereon a shaft rotatable on a shaft rotatably mounted on a frame, locking pawl means on the frame for engaging the ratchet teeth to prevent protractive rotation of the reel, a lock cup having teeth thereon mounted for rotation on the frame, means connecting the lock cup with the locking pawl such that rotation of the lock cup causes the locking pawl to engage the ratchet teeth, latch means which pivots into the teeth of the lock cup and latch drive means on the shaft for rotation therewith for pivoting the latch means into the lock cup and to rotate the lock cup to drive the locking pawl into the ratchet teeth, the method comprising the steps of:

provinding teeth on the lock cup of a number equal to the number of ratchet teeth, allowing the latch driving means to rotate with respect to the shaft, orienting the latch driving means with respect to the shaft by rotating the shaft, engaging the lock cup with the latch, and continuing rotating the shaft until the lock cup drives the locking pawl into the path of the ratchet teeth to stop the rotation of the shaft whereby the latch drives the latch driving means about the shaft until the lock cup stops the latch from moving as the pawl fully engages the ratchet teeth to stop rotation of the lock cup, then fixing the latch driving means to the shaft by inserting a member of resilient material between the shaft and the latch driving means whereby the resilient material is gripped by both the latch driving means and the shaft so that they can rotate together whereby the position of the lock cup is fixed with respect to each tooth of the ratchet teeth as each is engaged by the locking pawl.

* * * * *

UNITED STATES PATENT AND TRADEMARK OFFICE
CERTIFICATE OF CORRECTION

PATENT NO. : 4,148,446

DATED : April 10, 1979

INVENTOR(S) : Joseph Sugar

It is certified that error appears in the above-identified patent and that said Letters Patent are hereby corrected as shown below:

Column 3, line 4, change "restractor" to --retractor--; line 12, change "grear" to --gear--; line 15, insert after "gear" (second occurrence) and before "for" --to impart rotary motion from the drive means to the gear and--.

In Claim 8, line 9, insert before "during" --teeth--.

In Claim 18, line 5, change "latch" (second occurrence) to --latching--.

In Claim 21, line 4, after "thereon" insert --on--, and after "shaft" delete "rotatable on a shaft".

Signed and Sealed this

Thirty-first Day of July 1979

[SEAL]

Attest:

*Attesting Officer*

LUTRELLE F. PARKER
*Acting Commissioner of Patents and Trademarks*